United States Patent [19]
LaRosa et al.

[11] Patent Number: 5,247,544
[45] Date of Patent: Sep. 21, 1993

[54] PHASE ADJUSTMENT METHOD AND APPARATUS FOR USE IN A CLOCK RECOVERY CIRCUIT

[75] Inventors: Christopher P. LaRosa, Lake Zurich; Michael J. Carney, Palatine, both of Ill.

[73] Assignee: Motorola, Inc., Schaumburg, Ill.

[21] Appl. No.: 858,272

[22] Filed: Mar. 26, 1992

[51] Int. Cl.$^5$ .................... H04L 7/00; H04L 25/36; H04L 25/40; H03D 3/24
[52] U.S. Cl. .................................. 375/118; 375/106; 375/119
[58] Field of Search ............... 328/63, 72; 307/510, 307/511, 523; 375/106, 118, 119

[56] References Cited

U.S. PATENT DOCUMENTS

| | | | |
|---|---|---|---|
| 4,376,309 | 3/1983 | Fenderson et al. | 375/101 |
| 4,667,333 | 5/1987 | Butcher. | |
| 4,815,103 | 3/1989 | Cupo et al. | 375/14 |
| 4,953,185 | 8/1990 | Goode. | |
| 5,048,060 | 9/1991 | Arai et al. | 375/106 |

*Primary Examiner*—Curtis Kuntz
*Assistant Examiner*—Duane Kobayashi
*Attorney, Agent, or Firm*—Kirk W. Dailey; Rolland R. Hackbart; John A. Fisher

[57] ABSTRACT

A clock recovery circuit employs a method of and apparatus for adjusting the phase of a recovered clock signal. The clock signal is recovered from a received input signal. The clock recovery circuit generates a sampling clock signal which is synchronous with the received signal. Additionally, the phase adjustment apparatus generates at least two error signals which indicate the quality of the received signal at different sampling phases. The smallest error signal is referred to as the minimum error value. Each error signal is compared to the minimum error value, creating a corresponding normalized error magnitude signal. Each normalized error magnitude signal is processed to determine the desired phase of the sampling clock signal. Dependent upon the processing of the normalized error magnitude signals, the phase of the sampling clock signal is either shifted or maintained until the next sampling point. The phase of the sampling clock signal is maintained during periods indicating poor received input signal quality.

9 Claims, 4 Drawing Sheets

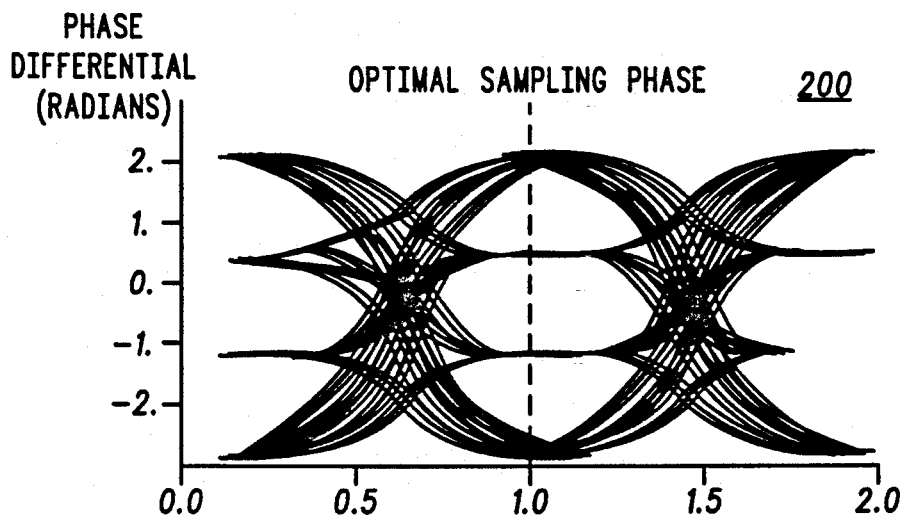
FIG. 2
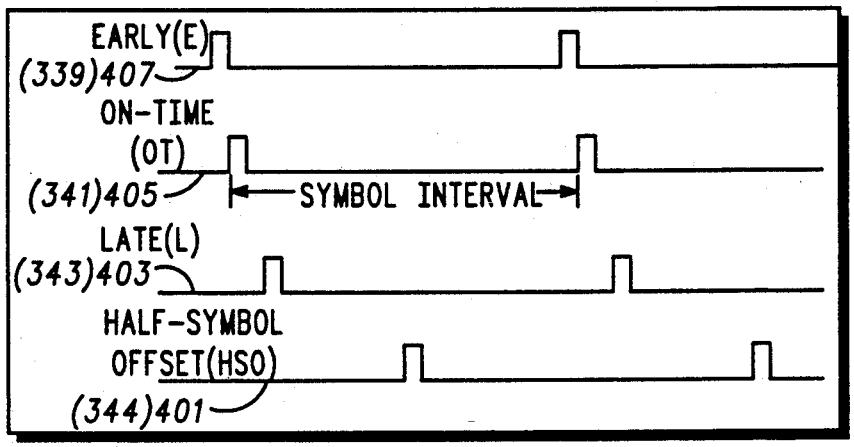
FIG. 4
FIG. 5
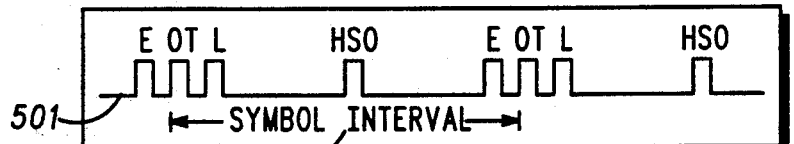
FIG. 7

PHASE ADJUSTMENT METHOD AND APPARATUS FOR USE IN A CLOCK RECOVERY CIRCUIT

FIELD OF THE INVENTION

This invention generally relates to clock recovery methods and apparatus and more specifically to a method and apparatus of phase adjustment for use in a clock recovery circuit within a radiotelephone communications system.

BACKGROUND OF THE INVENTION

Recently in the field of radio frequency (RF) communications, there has been an increased demand for digitally encrypted voice and high speed data communications. Since the RF spectrum is inherently limited, one must devise a new system concept and organizational features to accommodate the increased demand. A time division multiple access (TDMA) system is one such system which offers more efficient spectrum utilization and increased capacity.

In its simplest form, a TDMA system is comprised of a transmitting base station, which is capable of time multiplexing messages from at least two users on a single RF channel, and one or more remote receiving stations capable of receiving at least one of the time multiplexed messages. Typically, the receiving station would be a mobile or portable radiotelephone capable of transmitting a TDMA message to the base station on a second RF channel.

In a TDMA system, like most digital communications systems, it is necessary to establish a reference clock in the receiving station that is continuously synchronized with the transmit clock in order to accurately recover the digital data transmitted between the two points. Continuous bit synchronization, as used herein, means that the frequency and phase of the received clock signal must accurately track that of the transmit clock.

Bit synchronization over a mobile communications channel can be difficult to maintain, primarily due to multipath fading. In addition to tracking the drift between the mobile and base station clocks, the clock recovery mechanism must be sufficiently tolerant of noise such that it does not readily lose synchronization during the periods of degraded signal-to-noise ratio caused by fading. Hence, an ideal TDMA mobile clock recovery circuit would have fast initial acquisition of symbol synchronization and continuously maintain synchronization with the base site clock, even during periods of severe signal fading.

One method which has been developed to provide a continuously synchronized clock signal for the mobile radiotelephone utilizes a phase-locked loop (PLL) to recover a clock in response to an appropriate bit rate timing signal derived from the received waveform. This circuit, however, would have difficulty maintaining synchronization during periods of severe fading. A second technique for clock recovery utilizes a programmable divider coupled to a reference clock signal. The recovered clock signal is compared to the received data signal, and the divide ratio is momentarily altered to shift the phase of the recovered clock. Again, this phase comparison technique would generally lose synchronization during a period of heavy fading.

Further developments have been made to address the problem of losing synchronization during a severe fade. One such method utilizes received signal strength information (RSSI) to determine when the received signal-to-noise ratio is poor due to a deep fade or signal dropout. When the RSSI falls below a predetermined threshold, the clock recovery phase shifting circuitry is disabled, thereby preventing random phase adjustment of the recovered clock signal.

Although this technique offers improved performance in fading, it has several problems. First, it requires an additional interface to the clock recovery circuitry for the RSSI. Second, additional circuitry is required to process the RSSI. Third, the RSSI threshold needs to be calibrated for each radio due to make tolerances in the RSSI circuitry. Finally, since this technique uses received signal strength as a channel quality indicator, it cannot detect poor channel quality caused by strong co-channel or adjacent channel interference. During this time the recovered clock may jitter randomly and lose synchronization.

Therefore, a need exists for a clock recovery circuit which will maintain continuous synchronization with the base station transmitting clock without the problems associated with the aforementioned techniques.

SUMMARY OF THE INVENTION

The present invention encompasses a method of phase adjustment for use in a clock recovery scheme. The phase adjustment circuit automatically holds the clock phase during periods of poor channel quality, which could be caused by such conditions as multipath fading, signal dropout, or strong interference. The clock recovery scheme generates a sampling clock signal which is synchronous with the received signal. Additionally, the clock recovery scheme generates at least two error signals which indicate the quality of the received signal at different sampling phases. The smallest error signal is referred to as the minimum error value. Each error signal is compared to the minimum error value, creating a corresponding normalized error magnitude signal. Each normalized error magnitude signal is processed to determine the desired phase of the sampling clock signal. Dependent upon the processing of the normalized error magnitude signals, the phase of the sampling clock signal is either shifted or maintained until the next sampling point.

BRIEF DESCRIPTION OF THE DRAWINGS

FIG. 2 is an eye diagram of $\pi/4$ QPSK data at the output of a differential detector.

FIG. 4 is a diagram illustrating multiple phase offset clocks used in the present invention.

FIG. 5 is an example of a non-uniform sampling clock combining the individual clocks of FIG. 4 in accordance with the present invention.

FIG. 7 is a table defining the three level slicer shown in the block diagram of FIG. 6.

DESCRIPTION OF A PREFERRED EMBODIMENT

The preferred embodiment encompasses a digital receiver of a radiotelephone. The digital receiver includes decision-directed clock recovery circuitry for use in demodulating the received signal. The clock recovery circuitry utilizes a method of adjusting the sampling phase which provides inherent protection against fading-induced clock misalignment. Moreover, this technique is easily implemented in either a digital signal processor (DSP) or digital logic circuitry. The phase adjustment method utilizes a unique timing discriminant which has inherent fade protection; it automatically holds its sampling phase during the fade without the aid of a channel quality indicator such as RSSI.

Figure 1:
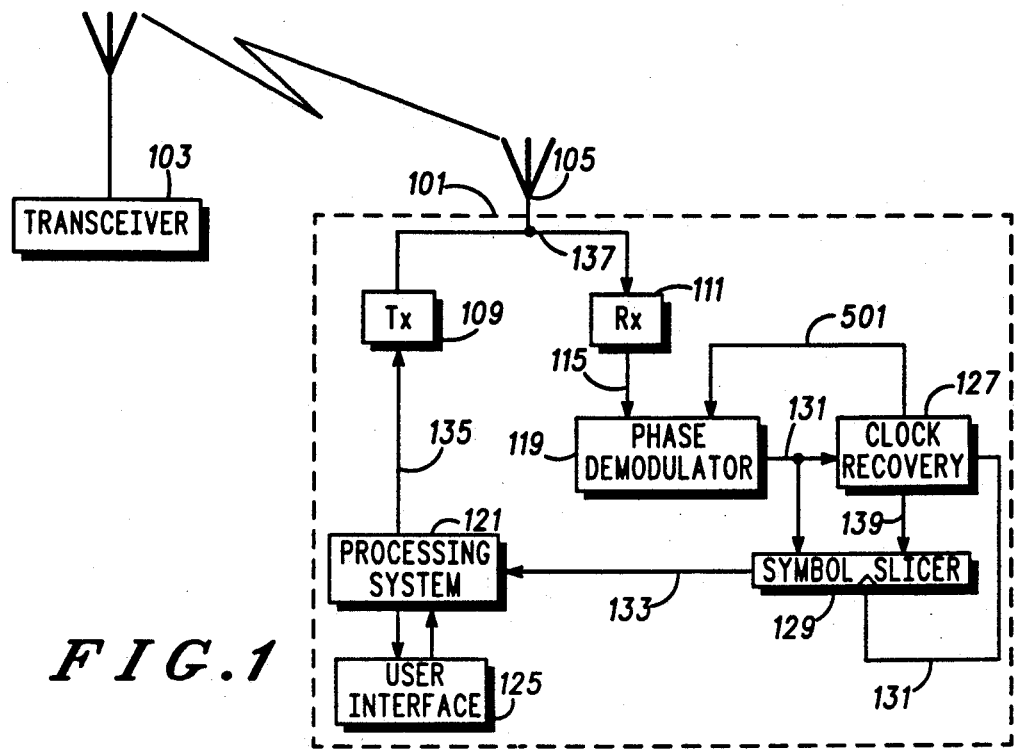
FIG. 1 is a block diagram of the radiotelephone communications system in accordance with the present invention.

FIG. 1 is a block diagram of a radiotelephone system which employs the present invention. In the radiotelephone system, the fixed site transceiver 103 sends and receives radio frequency (RF) signals to and from mobile and portable radiotelephones contained within a fixed geographic area. The radio telephone 101 is one such radiotelephone served by the fixed site transceiver 103.

While receiving signals from the fixed site transceiver 103, the radiotelephone 101 uses the antenna 105 to couple the RF signal and to convert the RF signal into an electrical radio frequency signal 137. The electrical RF signal is received by the radio receiver 111 for use within the radiotelephone 101. The receiver 111 generates an intermediate frequency (IF) signal 115. This signal 115 is input into the phase demodulator 119. The phase demodulator 119 outputs a phase demodulated signal 131 for use by the clock recovery circuitry 127 and the symbol slicer 129. The clock recovery circuitry 127 outputs the center point clock 139 to the symbol slicer 129. The phase demodulator signal 131 is also used as the received data signal for the symbol slicer 129. The symbol slicer in turn outputs a symbol signal 133 for use by the processor 121. The processor 121 formats the symbol signal 133 into voice and/or data for the user interface 125. The user interface 125 contains a microphone, a speaker and a keypad.

Upon transmission of RF signals from the portable radiotelephone 101 to the fixed site transceiver 103, the voice and/or data signals from the user interface 125 are processed by the processor 121. The processed signals are input into the transmitter 109. The transmitter 109 converts the processed signals into electrical RF signals. The electrical RF signals are converted into RF signals and output by the antenna 105. The RF signals are received by the fixed site transceiver 103, which interfaces to the land-line telephone signals.

FIG. 2 is an illustration of an eye diagram of a $\pi/4$ quadrature phase shift keying (QPSK) signal at the output of a differential detector. This signal is representative of the data output on the phase demodulated signal 131. For accurate recovery of the symbols transmitted between the transceiver 103 and the portable radiotelephone 101, the sampling clock 139 should sample the received data signal 131 at or near the optimal sampling point as illustrated in FIG. 2. Sampling at points other than the optimal location can cause degraded bit error rate (BER) performance.

Figure 3:
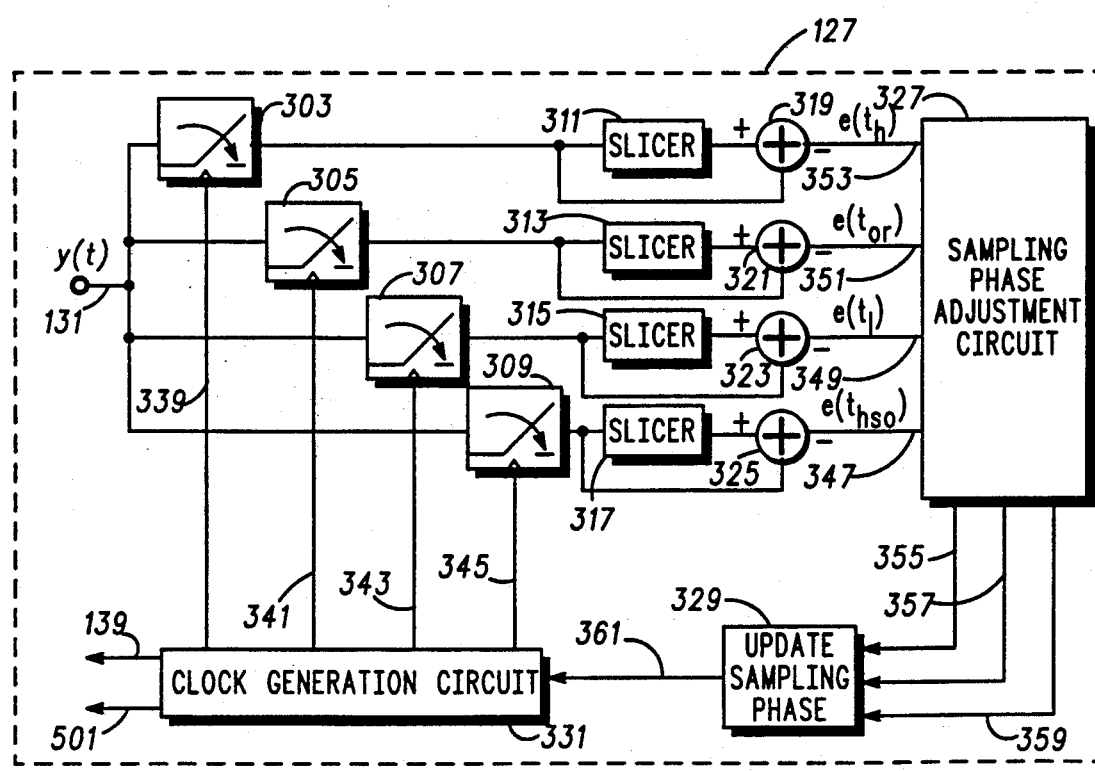
FIG. 3 is a block diagram of clock recovery circuitry in accordance with the present invention.

FIG. 3 is a detailed block diagram of the clock recovery circuitry 127 utilized in the preferred embodiment. The clock recovery circuitry uses the phase demodulator output signal y(t) 131 to recover the clock signals. In the preferred embodiment, the clock generation circuit 331 generates four individual clock signals 339, 341, 343, 345. These clocks are used to sample and hold the phase demodulator output signal y(t) 131.

Other equally sufficient implementations of the present invention may generate two or more clock signals to perform the phase adjustments according to the present invention.

In the preferred embodiment, the relative phases of the four clock signals are shown in FIG. 4. The on-time signal 405 has a clock pulse once each symbol interval. The early clock signal 407 generates a clock pulse at intervals equal to the intervals of the on-time signal 405, but shifted in phase by ⅛ of a symbol time before the on-time signal 405. The late clock signal 403 is equal in frequency and shifted by ⅛ of a symbol interval later than the on-time signal 405. The half-symbol offset clock signal 401 is identical to the on-time signal in frequency and shifted by ½ a symbol interval. Other equally sufficient implementations may be used by varying the phase offsets but are still considered within the essence of the invention disclosed herein.

These clock signals are used to sample the phase demodulator output signal 131 with the sample and hold circuits 303, 305, 307, 309. These sampled phases are then input into the slicer and adder combination to form error signals 347, 349, 351, 353. The error signal is formed by taking the difference between the sampled detector output signal and the nearest corresponding decision point, i.e., the slicer output.

The error signals 347, 349, 351, 353, are input into the sampling phase adjustment circuitry 327. The sampling phase adjustment circuit 327 is used to advance or retard the four symbol clocks to minimize the error at the on-time sampling point. If the error signals indicate that a change in the sampling phase is required, then the sampling phase adjustment circuit 327 will output one of the three possible clock adjustment commands: "move early", "move late", or "move half symbol". A move early command will advance all four symbol clocks 339, 341, 343, 345 by ⅛ of a symbol time. A move late command will retard all four symbol clocks by ⅛ of a symbol time. Similarly, the move half symbol command will shift all four symbol clocks by ½ of a symbol time. The clock generation circuit 331 also outputs an additional on-time clock referred to as the sampling clock signal 139, which is used by the symbol slicer 129 of FIG. 1.

Four individual slicers are shown in FIG. 3 for ease of illustration. An equally sufficient embodiment may combine the symbol slicer 129 and the on-time symbol slicer 313, thereby reducing the circuitry necessary for clock recovery.

The non-uniform sampling clock 501 of FIG. 5 is used to sample the phase within the phase demodulator 119. It is formed by ORing the four individual clocks 401, 403, 405, and 407.

Conventional phase adjustment techniques select the sampling phase with the smallest average error magnitude as determined directly from the error signals. During a deep fade or signal dropout, all sampling phases will yield similar error signals. In response, a conventional phase adjustment technique would randomly select its sampling phase. These random phase selections would cause bit errors, loss of synchronization, and potentially a dropped call.

In the preferred embodiment, the phase adjustment circuitry 327 maintains its current sampling phase until some other sampling phase yields an average error magnitude which is sufficiently smaller than all the others. This results in a sampling phase that will not change in low signal-to-noise ratio conditions. The improved decision rules for sampling point adjustment are implemented in the block diagram of FIG. 6.

In the preferred embodiment, the circuit decides to "move early", "move late", or "move half symbol". This phase adjustment technique may also be applied to more conventional clock recovery loops which permit only early and late clock adjustments or any other equally sufficient clock recovery circuits.

Figure 6:
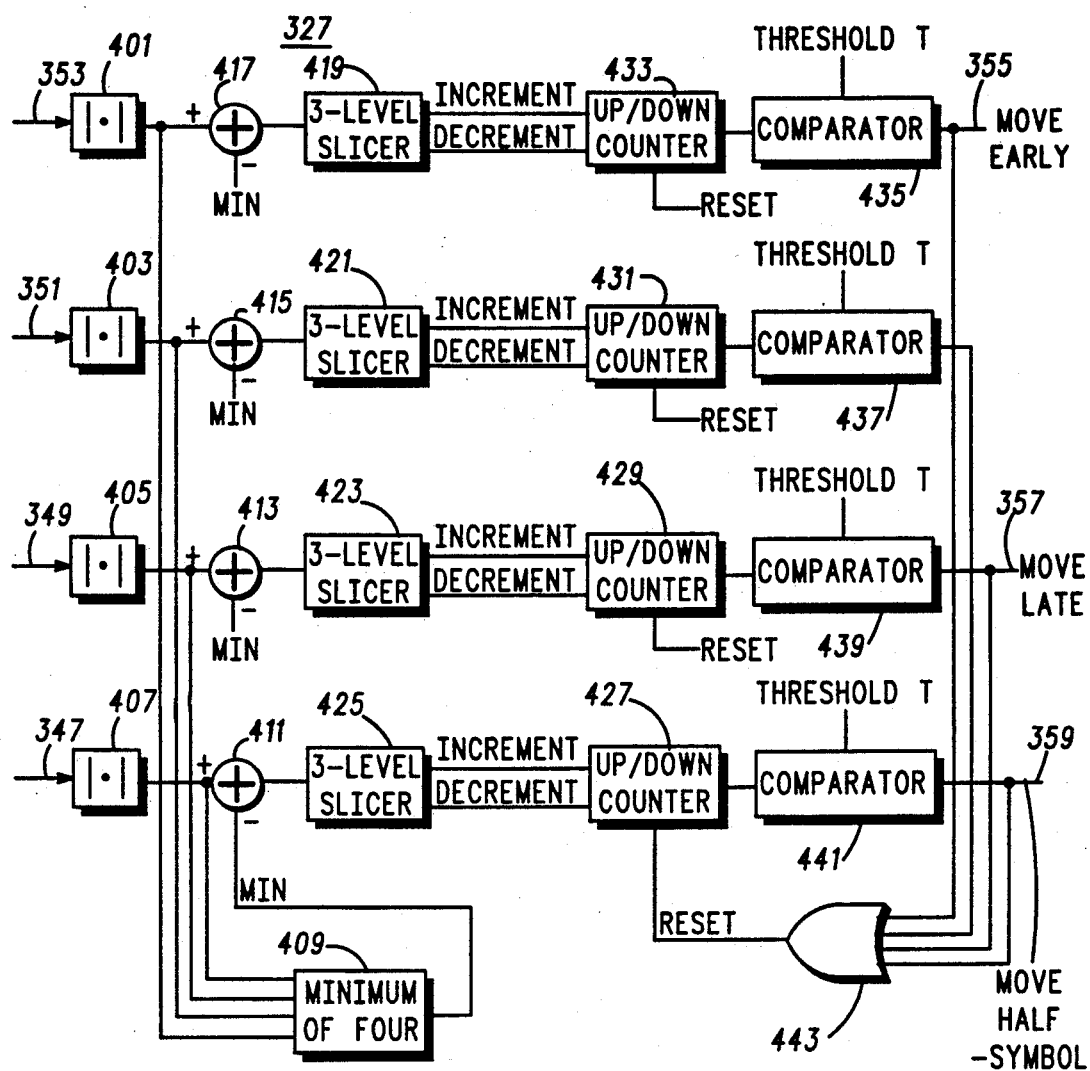
FIG. 6 is a block diagram of the phase adjustment circuitry in accordance with the present invention.

FIG. 6 is a block diagram illustrating the improved phase adjustment technique of the preferred embodiment. The first function of the sampling phase adjustment circuit 327 is to determine the magnitude of each error signal 347, 349, 351, 353, within the clocks 401, 403, 405, 407. Next, the smallest error magnitude signal is selected and called the minimum error value. This minimum error value is subtracted from each of the four error signals 347, 349, 351, 353, resulting in four normalized error magnitude signals. A three-level decision is then made for each sampling phase as a function of how its error magnitude compares to the minimum error magnitude.

Table 700 of FIG. 7 defines the logic utilized in the three-level slicer blocks 419, 421, 423, 425. If the error magnitude signal is sufficiently close to the minimum value, or the normalized error magnitude is less than a threshold $\Delta_1$, then the corresponding counter is incremented. If the error magnitude is large relative to the minimum value, or the normalized error magnitude is greater than a second threshold $\Delta_2$, then the corresponding counter is decremented. Finally, if the normalized error magnitude falls within the middle region, greater than the first threshold $\Delta_1$, and less than or equal to the second threshold $\Delta_2$, then the counter is held constant.

The first of the four counters 433, 431, 429, 427, to reach a predetermined positive threshold has demonstrated that its error magnitude is consistently smaller than that of the other three sampling phases; hence, the appropriate clock adjustment decision is then made. This is carried out in the block diagram by having the output value of the counters input into the comparators 435, 437, 439, 441. Here, the output values of the counters are compared to the predetermined threshold, T. If one of the counters reaches the threshold, then all of the counters 433, 431, 429, 427 are reset to zero, restarting the averaging process for the phase adjustment circuit. The reset function is implemented by ORing the outputs of the four comparators within the 4-input OR gate 443, which is then tied to the reset inputs of each of the four counters, 433, 431, 429, 427. The output of the first comparator 435 is equal to the move early phase adjustment signal 355. The output of the second comparator 437 is not tied to a shifting signal because the desired phase has already been obtained. The output of the third comparator 439 is the signal 357 of FIG. 3, which is a move late phase adjustment signal. The output of the fourth comparator 441 is the move half symbol phase adjustment signal 359.

In the case of a deep fade or a signal dropout, the four error signals will be random and identically distributed. As a result, each sampling phase's error magnitude will exceed the minimum value more often than it equals the minimum value by about a factor of 3 to 1 in the preferred embodiment. Thus, with the proper selection of the first threshold level $\Delta_1$ and the second threshold level $\Delta_2$ within FIG. 7, all of the counters will be decremented more often than they are incremented. Therefore, none of the counters will reach the positive threshold, T, during a time of signal dropout or deep fade; thus, the sampling phase will not change.

The fading performance of this phase adjustment technique has been simulated and compared to a more conventional early/late technique discussed previously. To ensure an unbiased comparison, the two loop thresholds were selected to yield identical tracking bandwidths equal to 0.001 times the symbol rate.

Figure 8:
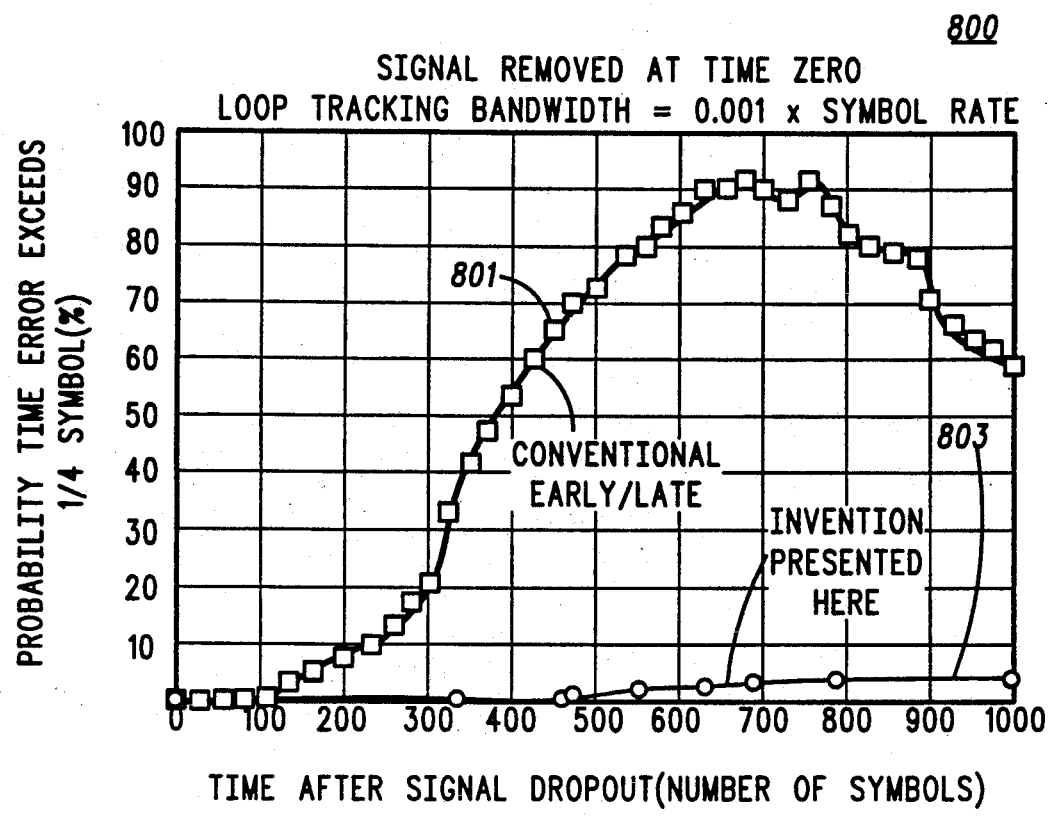
FIG. 8 is a graph representing the clock recovery performance following a received signal dropout in accordance with the present invention.

FIG. 8 plots the first performance test results. This test examined the length of time the clock recovery circuit could hold its sampling phase during a deep fade. This was done by initializing the sampling phase to the correct value and then removing the signal so the loop would operate strictly on thermal noise. The results plot the probability of the clock phase error exceeding one quarter of a symbol time versus the time after the signal dropout. The graph 801 illustrates the conventional early/late method and graph 803 illustrates the results of the present invention. As the results illustrate, the present invention holds its sampling phase quite well, whereas the conventional technique moves significantly off of the correct sampling point after only 300 symbols. Thus, even though both loops provide the same tracking capability, the clock adjustment circuit described herein does a significantly better job of maintaining its sampling phase through the duration of a fade.

Figure 9:
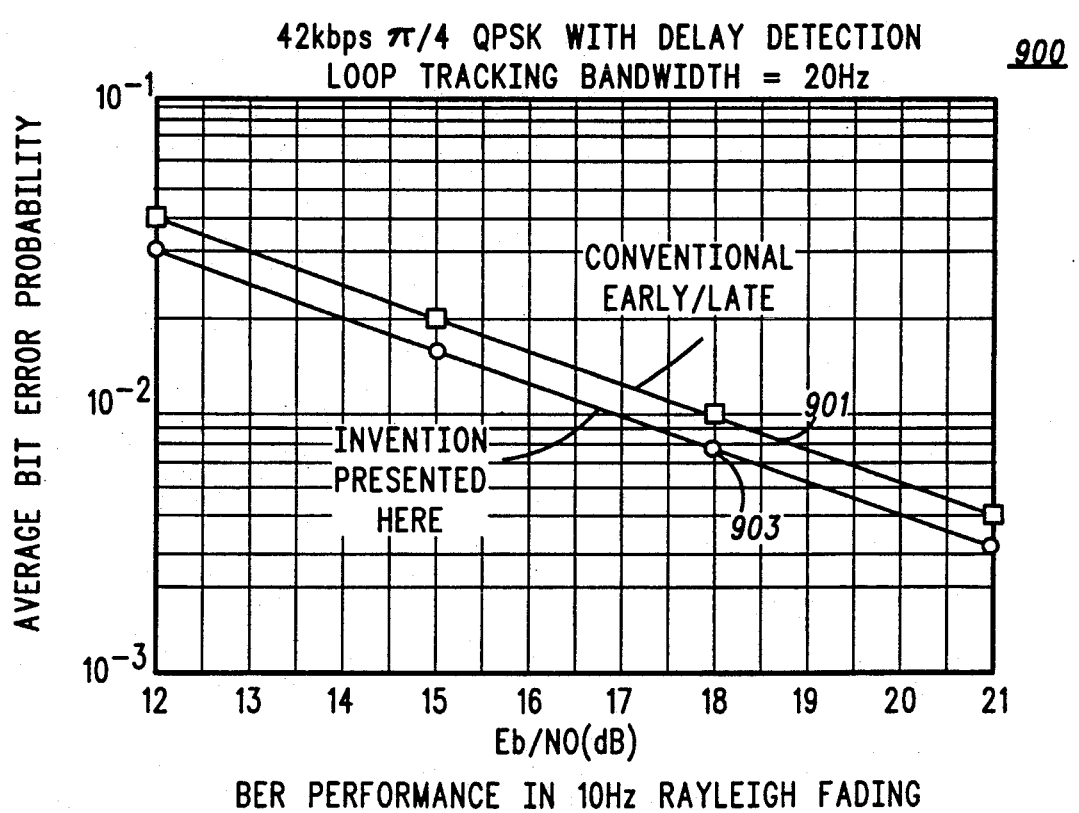
FIG. 9 is a graph of the average bit error probability versus signal-to-noise ratio in Rayleigh fading for a conventional system and the invention described herein.

FIG. 9 illustrates a second performance evaluation. This evaluation plots bit error rate versus signal-to-noise ratio for 42 kilobit per second $\pi/4$ QPSK modulation in 10 Hz Rayleigh fading. The graph 901 represents the conventional early/late technique, and the graph 903 represents the results of the present invention. Once again, both loops have identical tracking bandwidths equal to 20 Hz. As these plots illustrate, the proposed clock adjustment circuit provides near-theoretical performance, whereas the conventional early/late approach 901 degrades faded bit error rate performance by about 1.5 dB at a 1% bit error probability.

Described herein is a phase adjustment circuit for use in a digital radiotelephone having clock recovery circuitry. This invention offers a significant performance improvement in fading over previous designs without the additional circuitry and complications of using an external signal quality indicator as required by some other conventional techniques.

What is claimed is:

1. A method of phase adjustment in a clock recovery circuit, the clock recovery circuit generating a sampling clock signal having a phase and a first and a second error signal having magnitudes indicative of the quality of a first received signal, the first and the second error signals having a corresponding first and second counter value, the method comprising the steps of:

normalizing the first and the second error signals, forming a first and a second normalized error magnitude signal;

processing the first and the second normalized error magnitude signals, and determining, responsive to said step of processing, a desired phase of the sampling clock signal;

shifting, responsive to said desired phase, the phase of the sampling clock signal; and maintaining, responsive to said desired phase, the phase of the sampling clock signal.

2. A method of phase adjustment in accordance with claim 1 wherein said step of processing further comprises the steps of:

comparing the first and the second normalized error magnitude signals to a first threshold value;

changing, responsive to the first and the second normalized error magnitude signals being less than said first threshold value, the first and the second corresponding counter values;

comparing the first and the second normalized error magnitude signals to a second threshold value;

changing, responsive to the first and the second normalized error magnitude signals being greater than said second threshold value, the first and the second corresponding counter values; and comparing the first and the second corresponding counter values to a third threshold value, and determing, responsive to said step of comparing, a desired phase of the sampling clock signal.

3. A method of phase adjustment in accordance with claim 2 wherein said first step of changing further comprises incrementing the first and the second corresponding counter values.

4. A method of phase adjustment in accordance with claim 2 wherein said second step of changing further comprises decrementing the first and the second corresponding counter values.

5. A phase adjustment apparatus for use in a clock recovery circuit, the clock recovery circuit generating a sampling clock signal having a phase and a first and a second error signal indicative of the quality of a first received signal, the first and the second error signals having a first and a second corresponding counter value, the phase adjustment apparatus comprising:

means for normalizing the first and the second error signals, forming a first and a second normalized error magnitude signal;

means for processing the first and the second normalized error magnitude signals, and means, responsive to said means for processing, for determining a desired phase of the sampling clock signal;

means for shifting, responsive to said desired phase, the phase of the sampling clock signal; and means for maintaining, responsive to said desired phase, the phase of the sampling clock signal.

6. A phase adjustment apparatus in accordance with claim 5 wherein said means for processing further comprises:

first means for comparing the first and the second normalized error magnitude signals to a first threshold value;

first means for changing, responsive to the first and the second normalized error magnitude signals being less than said first threshold value, the first and the second corresponding counter values;

second means for comparing the first and the second error magnitude signals to a second threshold value;

second means for changing, responsive to the first and the second normalized error magnitude signals being greater than said second threshold value, the first and the second corresponding counter values; and third means for comparing the first and the second corresponding counter values to a third threshold value, and means, responsive to said means for comparing, for determining a desired phase of the sampling clock signal.

7. A phase adjustment apparatus in accordance with claim 6 wherein said first means for changing further comprises incrementing the first and the second corresponding counter values.

8. A phase adjustment apparatus in accordance with claim 6 wherein said second means for changing further comprises decrementing the first and the second corresponding counter values.

9. A radiotelephone including a clock recovery circuit for providing an output clock signal which is synchronized with a received data signal when the radio transceiver is receiving, and which maintains continuous bit synchronization for a given period of time when the data signal is not received, the radiotelephone comprising:

means for receiving an RF signal having a data signal modulated thereon, and for demodulating said RF signal to provide a received data signal; and the clock recovery circuit comprising:

means for generating a first and a second error signal;

means for normalizing the first and the second error signals, forming a first and a second normalized error magnitude signal;

means for processing the first and the second normalized error magnitude signal, and means, responsive to said means for processing, for determining a desired phase of the output clock signal;

means for shifting, responsive to said desired phase, the phase of the output clock signal; and means for maintaining, responsive to said desired phase, the phase of the output clock signal.

* * * * *